(12) United States Patent
Akahane et al.

(10) Patent No.: US 7,848,321 B2
(45) Date of Patent: Dec. 7, 2010

(54) METHOD FOR HIGH SPEED SEARCH TABLES SWITCHING AND PACKET FORWARDING APPARATUS

(75) Inventors: Shinichi Akahane, Hachioji (JP); Kazuo Sugai, Hadano (JP)

(73) Assignee: Hitachi, Ltd., Tokyo (JP)

( * ) Notice: Subject to any disclaimer, the term of this patent is extended or adjusted under 35 U.S.C. 154(b) by 694 days.

(21) Appl. No.: 11/213,917

(22) Filed: Aug. 30, 2005

(65) Prior Publication Data

US 2006/0072574 A1  Apr. 6, 2006

(30) Foreign Application Priority Data

Oct. 4, 2004  (JP)  ............................. 2004-290892

(51) Int. Cl.
*H04L 12/28* (2006.01)
*H04L 12/56* (2006.01)
(52) U.S. Cl. ................................... 370/389
(58) Field of Classification Search ............. 370/395.5, 370/395.52, 395.53, 466, 469
See application file for complete search history.

(56) References Cited

U.S. PATENT DOCUMENTS

| 5,764,624 | A | 6/1998 | Endo et al. | |
|---|---|---|---|---|
| 6,771,662 | B1 * | 8/2004 | Miki et al. | 370/469 |
| 6,907,001 | B1 * | 6/2005 | Nakayama et al. | 370/230 |
| 7,227,867 | B1 * | 6/2007 | Ferguson et al. | 370/395.5 |
| 2002/0141403 | A1 | 10/2002 | Akahane et al. | |
| 2003/0012196 | A1 * | 1/2003 | Ramakrishnan | 370/390 |
| 2003/0016666 | A1 * | 1/2003 | Okamoto | 370/389 |
| 2003/0053414 | A1 | 3/2003 | Akahane et al. | |
| 2003/0225907 | A1 * | 12/2003 | Krishnan | 709/238 |
| 2004/0008685 | A1 * | 1/2004 | Yamano et al. | 370/395.5 |
| 2004/0246957 | A1 * | 12/2004 | Grimminger | 370/389 |

FOREIGN PATENT DOCUMENTS

JP  2002-374288  6/2001

OTHER PUBLICATIONS

E. Rosen et al., "Multiprotocol Label Switching Architecture", Network Working Group, Standards Track, Jan. 2001, pp. 1-60.

(Continued)

*Primary Examiner*—Chirag G Shah
*Assistant Examiner*—Minh-Trang Nguyen
(74) *Attorney, Agent, or Firm*—Stites & Harbison, PLLC; Juan Carlos A. Marquez, Esq

(57) ABSTRACT

The present invention is directed to rapidly replacing an output destination port with a bypass port and replacing packet output header information with bypass header information when a port accommodated by a router within an IP or MPLS network becomes faulty. The present invention provides a packet forwarding apparatus that accommodates two output ports. The packet forwarding apparatus is embodied in a structure having an element for storing the output information about each of a plurality of pieces of input header information, an element for storing the output information about an output port that is associated with input header information and used as a bypass in the event of a fault, and an output information address rewrite processor for writing, in the event of an output port failure, the output information address associated with an output port that should serve as a bypass.

6 Claims, 17 Drawing Sheets

OTHER PUBLICATIONS

E. Rosen et al., "MPLS Label Stack Encoding", Network Working Group, Standards Track, Jan. 2001, pp. 1-23.

L. Andersson et al., "LDP Specification", Network Working Group, Standards Track, Jan. 2001, pp. 1-132.

D. Awduche et al., "RSVP-TE: Extensions to RSVP for LSP Tunnels", Network Working Group, Standards Track, Dec. 2001, pp. 1-61.

R. Jamoussie et al., "Constraint-Based LSP Setup Using LDP", Network Working Group, Standards Track, Jan. 2002, pp. 1-42.

P. Pan et al., "Fast Reroute Extensions to RSVP-TE for LSP Tunnels", Network Working Group, Standards Track, May 2005, pp. 1-38.

* cited by examiner

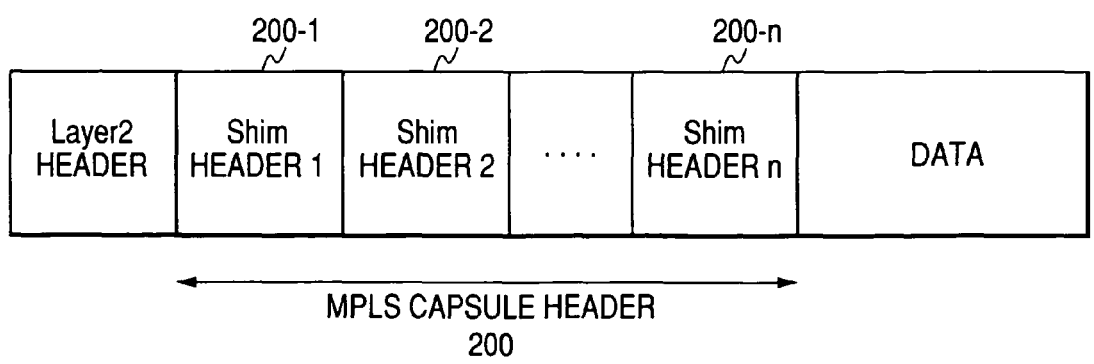

| PREAMBLE/SFD | DESTINATION MAC ADDRESS | SOURCE MAC ADDRESS | TYPE |

| PREAMBLE/SFD | DESTINATION MAC ADDRESS | SOURCE MAC ADDRESS | TAG PROTOCOL ID | PRIORITY | CFI | VLAN ID | TYPE |

Shim HEADER
200-1~200-n

FIG. 14

| 1390 | |
|---|---|
| PORT NUMBER (1391) | PORT STATE (1392) |
| 1 | 1 |
| 2 | 0 |
| ⋮ | ⋮ |
| N | 0 |

FIG. 15

| SEARCH KEY | | | SEARCH RESULT (ACTIVE) | | | | | | | SEARCH RESULT (STABD-BY) | | | | | | |
|---|---|---|---|---|---|---|---|---|---|---|---|---|---|---|---|---|
| INPUT LABEL INFORMATION | | | POP NUMBER | PUSH NUMBER | OUTPUT LABEL INFORMATION | | | OUTPUT PORT NUMBER | Next Hop IP | INTRA APPARATUS QOS INFORMATION | POP NUMBER | PUSH NUMBER | OUTPUT LABEL INFORMATION | | | OUTPUT PORT NUMBER | Next Hop IP | INTRA APPARATUS QOS INFORMATION |
| LABEL | EXP | | | | LABEL 1 | LABEL 2 | ... | | | | | | LABEL 1 | LABEL 2 | ... | | | |
| L11 | E1 | | 1 | 1 | L12 | – | – | 1 | IP 152-1 | Q1 | 1 | 2 | L31 | L12 | – | 2 | IP 153 | Q1 |
| L21 | E2 | | 1 | 1 | L22 | – | – | 1 | IP 152-1 | Q2 | 1 | 2 | L31 | L22 | – | 2 | IP 153 | Q2 |
| L21 | E3 | | 1 | 1 | L22 | – | – | 1 | IP 152-1 | Q3 | 1 | 2 | L31 | L22 | – | 2 | IP 153 | Q3 |
| ... | ... | | ... | ... | ... | ... | ... | ... | ... | ... | ... | ... | ... | ... | ... | ... | ... | ... |

FIG. 18

| INPUT LABEL INFORMATION | | ADDRESS TRANSLATION TABLE ADDRESS |
|---|---|---|
| LABEL | EXP | |
| L11 | E1 | 1 |
| L21 | E2 | 2 |
| L21 | E3 | 3 |
| ⋮ | ⋮ | ⋮ |

FIG. 19

| ADDRESS | SEARCH RESULT TABLE ADDRESS |
|---|---|
| 1 | 1 |
| 2 | 2 |
| 3 | 3 |
| ⋮ | ⋮ |

FIG. 20

| ADDRESS 1821 | POP NUMBER 1324 | PUSH NUMBER 1325 | SEARCH RESULT | | | OUTPUT PORT NUMBER 1327 | Next Hop IP 1328 | INTRA APPARATUS QOS INFORMATION 1329 |
|---|---|---|---|---|---|---|---|---|
| | | | OUTPUT LABEL INFORMATION 1326 | | 1323 | | | |
| | | | LABEL 1 | LABEL 2 | ... | | | |
| 1 | 1 | 1 | L12 | - | - | 1 | IP152-1 | Q1 |
| 2 | 1 | 1 | L22 | - | - | 1 | IP152-1 | Q2 |
| 3 | 1 | 1 | L22 | - | - | 1 | IP152-1 | Q3 |
| 4 | 1 | 2 | L31 | L12 | - | 2 | IP153 | Q1 |
| 5 | 1 | 2 | L31 | L22 | - | 2 | IP153 | Q2 |
| 6 | 1 | 2 | L31 | L22 | - | 2 | IP153 | Q3 |
| ... | ... | ... | ... | ... | ... | ... | ... | ... |

| INPUT LABEL INFORMATION | | STAND-BY IDENTIFIER | POP NUMBER | PUSH NUMBER | OUTPUT LABEL INFORMATION | | | ACTIVE OUTPUT PORT NUMBER | STAND-BY OUTPUT PORT NUMBER | Next Hop IP | INTRA APPARATUS QOS INFORMATION |
|---|---|---|---|---|---|---|---|---|---|---|---|
| LABEL | EXP | | | | LABEL 1 | LABEL 2 | ... | | | | |
| L11 | E1 | 0 | 1 | 1 | L12 | - | - | 1 | - | IP152-1 | Q1 |

FIG. 22

| INPUT LABEL INFORMATION | | STAND-BY IDENTIFIER | POP NUMBER | PUSH NUMBER | OUTPUT LABEL INFORMATION | | | ACTIVE OUTPUT PORT NUMBER | STAND-BY OUTPUT PORT NUMBER | Next Hop IP | INTRA APPARATUS QOS INFORMATION |
|---|---|---|---|---|---|---|---|---|---|---|---|
| LABEL | EXP | | | | LABEL 1 | LABEL 2 | ... | | | | |
| L11 | E1 | 1 | 1 | 2 | L31 | L12 | - | 1 | 2 | IP153 | Q1 |

METHOD FOR HIGH SPEED SEARCH TABLES SWITCHING AND PACKET FORWARDING APPARATUS

CLAIM OF PRIORITY

The present application claims priority from Japanese application JP 2004-290892 filed on Oct. 4, 2004, the content of which is hereby incorporated by reference into this application.

FIELD OF THE INVENTION

The present invention relates to a method and apparatus for packet forwarding and also relates to a method and apparatus for high-speed search table switching.

BACKGROUND OF THE INVENTION

Due to its low cost, an Internet Protocol (IP) network is becoming an important social infrastructure that will replace a telephone network. Therefore, the IP network is now required to assure communication quality (QoS: Quality of Service) that has been provided by a conventional telephone network. More specifically, it is demanded, for instance, that the IP network achieve high-speed recovery from a network failure, offer high reliability, and assure low delay time and low drop rate.

For example, a high-speed path switching technology (prior art 1), which is based on MPLS (Multi-Protocol Label Switching), is available as a network failure recovery method (refer to Non-Patent Documents 1 (E. Rosen, A. Viswanathan, R. Callon, "Multiprotocol Label Switching Architecture", RFC3031, Internet Engineering Task Force, January, 2001) and 2 (E. Rosen, T. Tappan, G. Fedorkow, Y. Rekhter, D. Farinacci, T. Li, A. Conta, "MPLS Label Stack Encoding", RFC3032, Internet Engineering Task Force, January, 2001) for MPLS and Non-Patent Document 3 (P. Pan, G. Swallow, A. Atlas, "Fast Reroute Extensions to RSVP-TE for LSP Tunnels", RFC4090, Internet Engineering Task Force, 2004) for the MPLS-based high-speed path switching technology).

First of all, MPLS will be summarized. MPLS is a packet forwarding method in which a router determines the packet forwarding destination in accordance with the value of a label attached to a packet.

The MPLS-based packet forwarding method will now be summarized with reference to FIG. 1.

FIG. 1 illustrates an MPLS network 100. The MPLS network 100 comprises edge routers ER1 (141), ER2 (142), ER3 (143), and ER4 (144), which are positioned at an entry or exit of the network, and core routers CR1 (151), CR2 (152), and CR3 (153), which are positioned within the MPLS network 100. The MPLS network 100 is configured, for instance, with a second layer transfer protocol (e.g., Ethernet (registered trademark)). A case where Ethernet is used as the second layer transfer protocol is used will be described below.

Each edge router accommodates a plurality of networks (networks NA (161), NB (162), NC (163), and ND (164)), which are interconnected via the MPLS network. Each edge router receives a packet from the accommodated networks, capsules the received packet with an MPLS capsule header, and forwards the capsuled packet to the MPLS network 100. For the sake of brevity, FIG. 1 shows only a label in the MPLS capsule header. For example, edge router ER1 receives packet P1 (171) from network NA, capsules packet P1 (171) with the MPLS capsule header, which contains label L11 (111), and forwards the capsuled packet to core router CR1. In this instance, the output port 181, label L11, and other MPLS capsule header elements are determined by using intra-header information such as the third layer transfer protocol (e.g., IP) of packet P1. A case where IP is used as the third layer transfer protocol will be described below.

Core routers CR1 and CR2 uses the MPLS capsule header to determine the output port and a new capsule header for output. If, for instance, core router CR1 receives packet P1, uses the value of label L11, which is attached to packet P1, to search for a label table retained in core router CR1, and determines output port 1020-1, output label L12 (112), and IP 152-1, which is the next forwarding destination IP address (hereinafter referred to as the next hop IP) that is assigned to the interface for port 1020-1 for router CR2 for next forwarding. Core router CR1 replaces label L11, which is attached to packet P1, with label L12. Further, core router CR1 determines a MAC (Media Access Control) address (MAC 152-1) that is assigned to the interface of port 1020-1 for core router CR2 from the next hop IP (IP 152-1), and gives the determined MAC address as the destination MAC address for the Ethernet frame. Subsequently, core router CR1 transmits packet P1 to output port 1020-1. The label attached to a received packet is hereinafter referred to as an input label. The label newly attached by a router at the time of transmission is hereinafter referred to as an output label. Similarly, core router CR2 determines the output port 182, output label L13 (113), and next hop IP (IP 143) for packet P1 to which input label L12 is attached, replaces input label L12 with output label L13, determines the destination MAC address (MAC 143) from the next hop IP (IP 143), gives the determined destination MAC address to the Ethernet frame, and transmits the packet to the output port 182.

When edge router ER3 receives packet P1 to which label L13 is attached, edge router ER3 uses label L13 only or label L13 and the information within the header for the third layer transfer protocol (IP in the present example) for packet P1 to determine the forwarding destination (network NC in FIG. 1), output port 183, and next hop IP, removes the MPLS capsule header, and transmits packet P1 to port 183. Packet P2 is also forwarded in the same manner as described above.

As described above, labels L11, L12, and L13 are used to forward packet P1 through a path between routers ER1 and CR1, a path between routers CR1 and CR2, and a path between routers CR2 and ER3. Labels L21, L22, and L23 are used to forward packet P2 through a path between routers ER2 and CR1, a path between routers CR1 and CR2, and a path between routers CR2 and ER4. These paths are called label switched paths (LSPs). The LSPs are set in accordance with a label distribution protocol or manually set by a network administrator. Available label distribution protocols include Label Distribution Protocol (LDP), Constraint-based Routing Label Distribution Protocol (CR-LDP), and Extensions to Resource Reservation Protocol for LSP Tunnels (RSVP-TE) (refer to Non-Patent Document 4 (L. Andersson, "LDP Specification", RFC3036, Internet Engineering Task Force, January 2001) for LDP, Non-Patent Document 5 (B. Jamoussi, "Constraint-Based LSP Setup using LDP", RFC3212, Internet Engineering Task Force, January 2002) for CR-LDP, and Non-Patent Document 6 (D. Awduche, L. Berger, T. Li, V. Srinivasan, G. Swallow, "RSVP-TE: Extensions to RSVP for LSP Tunnels", RFC3209, Internet Engineering Task Force, December 2001) for RSVP-TE).

Since the LSPs can be explicitly set, MPLS is advantageous in that it can offer paths in compliance with communication quality requirements for each traffic and permit traffic engineering for intra-network path load distribution.

A technology called "Facility Backup", which is one of the MPLS-based high-speed path switching technologies described in Non-Patent Document 3 (P. Pan, G. Swallow, A. Atlas, "Fast Reroute Extensions to RSVP-TE for LSP Tunnels", RFC4090, Internet Engineering Task Force, 2004), will now be described with reference to FIGS. 2 and 3.

This high-speed path switching technology sets only one switching LSP for a plurality of LSPs, which are set for the same port, in order to perform switching when the port becomes faulty. The LSP for switching in the event of a fault is hereinafter referred to as a stand-by LSP. The LSP for use under normal conditions is hereinafter referred to as an active LSP. When the high-speed path switching technology is employed, a label stack technology is used. The label stack technology assigns two or more labels in order to minimize the number of label table entries that are used to determine the output label and output port for an end-point router of the stand-by LSP.

FIGS. 2 and 3 illustrate only the MPLS network 100, which is one of the elements shown in FIG. 1. Networks NA, NB, NC, and ND are excluded from FIGS. 2 and 3.

FIG. 2 shows a packet forwarding operation that is performed while port 1020-1 is normal. FIG. 3 shows a packet forwarding operation that is performed while port 1020-1 is faulty (a fault in port 1020-1 is indicated by the letter "X" in FIG. 3).

FIG. 2 assumes that the LSP used to forward packet P1 while port 1020-1 is normal is LSP 1, and that the LSP used to forward packet P2 is LSP 2. The labels used for forwarding are the same as indicated in FIG. 1. The labels used for LSP 1 are label L11 (111), which is for a path between routers ER1 and CR1; label L12 (112), which is for a path between routers CR1 and CR2; and label L13 (113), which is for a path between routers CR2 and ER3. The labels used for LSP 2 are label L21 (121), which is for a path between routers ER2 and CR1; label L22 (122), which is for a path between routers CR1 and CR2; and label L23 (123), which is for a path between routers CR2 and ER4.

In FIG. 3, stand-by LSP 3, which is set for port 1020-1 for LSP 1 and LSP 2, is set for port 1020-2, which is for a path between routers CR1 and CR2, and set for port 184, which is for a path between routers CR3 and CR2. It is assumed that the label for use between routers CR1 and CR3 is label L31 (131), and that the label for use between routers CR3 and CR2 is label L32 (132).

A method for forwarding packet P1 when port 1020-1 is faulty will now be described with reference to FIG. 3. When core router CR1, which is shown in FIG. 3, detects a fault in port 1020-1, applies a change so that output labels L12 and L31 are used for input label L11 within the label table although only one output level (output level L12) has been formerly used. Further, core router CR1 applies another change so that output port 1020-2 is used in place of output port 1020-1. Still another change is also applied to the next hop IP so that IP 153 for router CR3 is used in place of IP 152 for router CR2. Router CR1 receives packet P1, and then determines from input label L11 to use output labels L12 and L31, output port 1020-2, and next hop IP 153. Subsequently, input label L11 is removed from packet P1. The label stack function is then exercised to give the aforementioned two output labels. In this instance, label L31, which is for use with the stand-by LSP, is given to a level higher than that for label L12 (to a position for early data transfer), which is for use with the active LSP 1.

Further, the MAC address (MAC 153) assigned to the interface for port 1020-2 of router CR3 is determined from the next hop IP (IP 153) and given as the destination MAC address for the Ethernet frame. Subsequently, router CR1 transmits packet P1 to port 1020-2. Upon receipt of packet P1, router CR3 uses only label L31 to decide on output port 184, output label L32, and next hop IP 152-2. It should be noted that label L31 is one of the two labels assigned to packet P1 and placed at a high position. Router CR3 replaces only input label L31 with output label L32. It should be noted that input label L31 is one of the input labels assigned to packet P1 and placed at a high position. The MAC address (MAC 152-2) assigned to the interface for port 184 of router CR2 is determined from the next hop IP (IP 152-2) and given as the destination address for the Ethernet frame. Subsequently, router CR3 transmits packet P1 to port 184. Upon receipt of packet P1, which is transmitted from router CR3, router CR2 recognizes from the value of label L32, which is one of the two labels assigned to packet P1 and placed at a high position, that router CR2 is positioned at the end point of stand-by LSP 3, and judges that the output port and output label should be determined by using label L12, which is assigned below label L32.

Subsequently, router CR2 uses label L12 to decide on output port 182, output label L13, and next hop IP 143. Router CR2 removes label L32 from packet P1 and replaces label L12 with output label L13. Further, router CR2 determines the MAC address (MAC 143) assigned to the interface for port 182 of router ER3 from the next hop IP (IP 143), and gives the determined MAC address as the destination address for the Ethernet frame. Later, router CR2 transmits packet P1 to port 182.

The method for forwarding packet P2 is the same as for packet P1. Although label L31, which is one of the two output labels assigned by router CR1 and placed at a high position, is the same as for packet P1, the remaining label for packet P2 is label L22. Further, packet P2 differs from packet P1 in that the output label for router CR2 is label L23. As described above, packet P1, which is forwarded through active LSP 1, and packet P2, which is forwarded through active LSP 2, are similarly forwarded through LSP 3.

In FIG. 3, router CR2, which is positioned at the end point of a stand-by LSP, uses high-level label L32 to recognize that router CR2 is positioned at the end point of stand-by LSP 3, and judges that a label (L12 or L22) assigned below label L32 should be used to determine the output port and output label. In this instance, router CR2 has to conduct a label table search twice depending on the employed label table search method. It means that a considerable amount of processing time is required. A PHP (Penultimate Hop Popping) method is used to avoid this problem. When this method is adopted, a router positioned immediately before the end point of a stand-by LSP is used to remove a label that is assigned to a high level. This method will now be described with reference to FIG. 4.

The label assignment method and packet forwarding method shown in FIG. 4 are virtually the same as described with reference to FIG. 3. However, these two figures differ in the label assignment method that is adopted by router CR3, which positioned immediately before end point router CR2 for stand-by LSP 3. Router CR2 uses label L31, which is assigned to a high position of received packets P1 and P2, to recognize that router CR2 is positioned immediately before the end point of stand-by LSP 3. Labels L12 and L22, which are assigned to a low position of label L31, are the same as the label for forwarding through an active LSP at end point router CR2 for stand-by LSP 3. Therefore, when router CR2 uses this label, router CR2 can determine the same output port and output label as for an active LSP. Consequently, router CR3 removes only label L31, which is assigned to a high position, and transmits a packet to output port 184. Router CR2, which receives the packet, uses only one assigned label (label L12 or L22) to determine the output port and output label. When the PHP method described above is used, a label table search needs to be conducted only once at router CR2, and the required processing time is the same as for a forwarding process that is performed with an active LSP.

When a network is formulated by using the ATM (Asynchronous Transfer Mode) technology instead of the MPLS technology, a technology for making a high-speed switch in the event of a fault in an ATM exchange for data transfer (prior art 2) (refer to Patent Document 1 (Japanese Patent JP-A No. 24220/1996)) is available. Prior art 2 has an active routing table, which store normal path translation header information in the ATM exchange in advance, and a stand-by routing table, which stores stand-by path translation header information. Further, prior art 2 has a memory that stores a faulty port and a virtual path identifier (hereinafter referred to as the VPI) for a faulty virtual path as a bitmap. The ATM exchange processes data in the unit of a 53-byte cell. When a cell arrives, the ATM exchange based on prior art 2 references the memory in which the faulty port and faulty VPI are stored, and checks for an output port fault. If the output port is not faulty, the header information stored in the active routing table is used for cell header information translation. If the output port is faulty, the header information stored in the stand-by routing table is used for cell header information translation. After header information translation, the ATM exchange based on prior art 2 transmits the cell to the next ATM exchange.

SUMMARY OF THE INVENTION

Prior art 1, which has been described earlier, sets a single common LSP for a plurality of LSPs that are set within the same port. Therefore, when compared to a method in which a stand-by LSP is set for each of a plurality of LSPs, prior art 1 can reduce the number of LSPs that a router within an MPLS network manages. If, for instance, the number of LSPs set for a particular port is N, prior art 1 has to manage (N+1) LSPs. However, when stand-by LSPs are set on a one-to-one basis, it is necessary to manage 2N LSPs.

However, prior art 1 does not define a method for causing a router to switch from an active LSP to a stand-by LSP. The problem to be solved for allowing a router to switch from an active LSP to a stand-by LSP will be described below.

FIG. 5 shows typical contents of a CR1 label table that prevails when port 1020-1 is normal as indicated in FIG. 2. FIG. 6 shows typical contents of a CR1 label table that prevails when port 1020-1 is faulty as indicated in FIG. 3. The label table sets a plurality of combinations of an output label, output port, and next hop IP (hereinafter referred to as label table entries) for input labels. In FIGS. 5 and 6, two label table entries (LE1 and LE2) are set.

In FIG. 2, two LSPs (LSP 1 and LSP 2) are set for port 1020-1. LSP 1 ensures that the label to be assigned to a packet is translated into labels L11, L12, and L13. LSP 2 ensures that the label to be assigned to a packet is translated into labels L21, L22, and L23. In this instance, label table entries that router CR1 retains to determine the output label, output port, and next hop IP from an input label are a label L11 entry (LE1) and label L12 entry (LE2) as indicated in FIG. 5.

When port 1020-1 is faulty, the output labels, output ports, and next hop IPs for LE1 and LE2 in FIG. 5 need to be rewritten as indicated for LE1 and LE2 in FIG. 6. The rewrite process will now be described in detail with reference to LE1 in FIGS. 5 and 6. If port 1020-1 becomes faulty, router CR1 changes the output label for LE1 in FIG. 5 from L21 to L21 and L31. Router CR1 also changes the output port from 1020-1 to 1020-2. Further, router CR1 changes the next hop IP for LE1 in FIG. 5 from IP 152-1 to IP 253. The above rewrite process needs to be performed for all label table entries (two entries (LE1 and LE2) in the currently used example) for which port 1020-1, which is faulty, is set as an output port.

As described with reference to FIGS. 5 and 6, if a certain port becomes faulty, a router has to rewrite the output labels, output ports, and next hop IPs of all label table entries for which the faulty port is set as an output port. For a large-scale network, many LSPs are set for the same port so that there are many label table entries. Therefore, if a port becomes faulty, an increased amount of time is required for rewriting many label table entries. A packet corresponding to an entry for which the rewrite process has not been completed is output to a faulty port and discarded. Therefore, if an increased amount of time is required for a label table entry rewrite, an increased amount of data is discarded. In the event of a fault, therefore, it is necessary to use a method for rewriting a label table entry at a high speed.

Prior art 2, which has been described earlier, permits an ATM exchange to switch routing tables at a high speed. However, prior art 2 does not define the support for IP and MPLS, which will be used in the future to establish a network such as the Internet. For IP and MPLS, the output label, output port, and next hop IP are required as the information corresponding to the input label. However, prior art 2 does not contain any information about next hop IP.

A first object of the present invention is to provide means for switching search tables at a high speed in the event of a network failure. A second object of the present invention is to provide IP and MPLS, which are major protocols for future network establishment, with the means for switching search tables at a high speed.

In accomplishing the above objects, according to one aspect of the present invention, there is provided a packet forwarding apparatus comprising switching means that includes a plurality of input/output ports; and header information storage means for storing a plurality of pieces of header information associated with an output port for use under normal conditions and an output port serving as a bypass port in the event of a fault for each of a plurality of labels used for packet switching and storing different information corresponding to the header information.

According to another aspect of the present invention, there is provided a packet forwarding apparatus comprising port state storage means for storing information indicating whether accommodated input/output ports are normal; selection means for selecting at least one of a plurality of pieces of header information read from the header information storage means in accordance with the status of an output port for outputting a packet, which is read from the port state storage means for each packet received from each input port; and header rewrite means for rewriting the header information about an input packet in accordance with header information selected by the selection means.

As the header information stored by the header information storage means and the different information corresponding to the header information, for example, the label, output port number, and IP address to be assigned to a packet forwarding apparatus port interface for the next transfer, which are within the shim header written in Request for Comment (RFC) 3032, may be used.

When an output port becomes faulty, the above packet forwarding apparatus can rapidly change the output port for a received packet and the header information to be assigned at the time of output by performing a rewrite to change the associated port state of the port state storage means from normal to abnormal.

Further, the packet forwarding apparatus according to the present invention may include output information address storage means, output information registration address list storage means, and output information address rewrite means. The output information address storage means stores an output information storage means identification address that is provided for each of the plurality of input labels on an individual input label basis. The output information registration address list storage means stores a list of a pair of a plurality of addresses for registering output information associated with an output port serving as a bypass port in the event of a fault, which is associated with the input label, and an output information address storage means address associated with the input label. The addresses are listed for each packet output port that prevails under normal conditions. The output information address rewrite means reads the output information registration address list corresponding to a faulty output port from the output information registration address list storage means in the event of an output port fault, and writes the address of output information associated with an output port serving as a bypass port for the output information address storage means address.

When an output port becomes faulty, the packet forwarding apparatus reads a stored header information registration address list, which is associated with the faulty output port, from the header information registration address list storage means, and consecutively writes header information registration addresses, which are associated with an output port serving as a bypass port, at a plurality of header information address storage means addresses registered in the header information address list, thereby making it possible to rapidly change the output port for a received packet and the header information to be assigned at the time of output.

The present invention provides the packet forwarding method described above and a hardware configuration for implementing the packet forwarding method. Other features and advantages of the present invention will be apparent from the following detailed description of the preferred embodiments and from the accompanying drawings.

When a packet forwarding apparatus according to the present invention is applied to a network and a port accommodated by the packet forwarding apparatus becomes faulty, it is possible to rapidly switch from a packet output port and header information to another output port, which serves as a bypass port, and the associated header information. Thus, the number of packets output to a faulty port can be minimized.

BRIEF DESCRIPTION OF THE DRAWINGS

FIG. 5 illustrates a label table that is possessed by router CR1, which is shown in FIG. 2;

FIG. 6 illustrates a label table that is possessed by router CR1, which is shown in FIGS. 3 and 4;

FIG. 7 shows a typical packet format for use in an MPLS network;

FIG. 14 shows a typical structure of a port state table;

FIG. 15 shows a typical structure of a label table;

FIG. 18 shows a typical structure of a label judge table;

FIG. 19 shows a typical structure of an address translation table;

FIG. 20 shows a typical structure of a search result table;

FIG. 21 shows a typical structure of label table write information that is used when an active search result is written;

FIG. 22 shows a typical structure of label table write information that is used when a stand-by search result is written.

DETAILED DESCRIPTION OF THE PREFERRED EMBODIMENTS

First Embodiment

First of all, the data format for an MPLS-capsuled packet and an MPLS capsule header format will be described with reference to FIGS. 7, 8, 9, and 10.

FIG. 7 shows the data format for an MPLS-capsuled packet. The MPLS-capsuled packet comprises a layer 2 header, which is a header of a second-layer protocol such as PPP and Ethernet, an MPLS capsule header 200, and packet data. The MPLS capsule header 200 comprises n shim headers (n: 1 or greater integer), which range from shim header 1 to shim header n (200-1 to 200-n) A data section 220 comprises the packet data that is capsuled with an IP or other third-layer protocol header.

Figures 8, 9, 10:
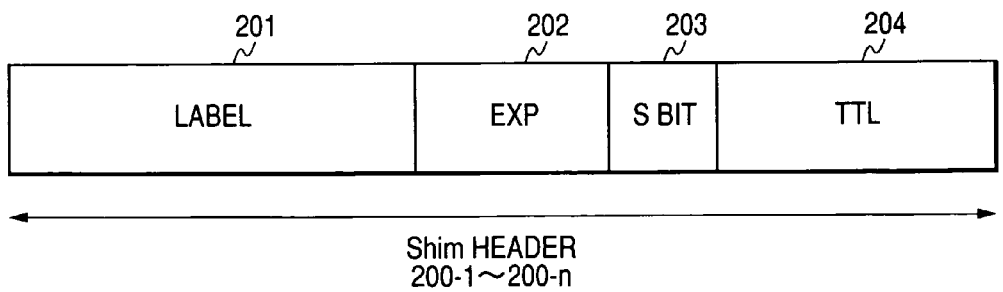
FIG. 8 illustrates an Ethernet V2 header structure.
FIG. 9 illustrates a tag VLAN type Ethernet V2 header structure.
FIG. 10 shows a typical format of a shim header that is an MPLS capsule header.

FIG. 8 shows the structure of an Ethernet V2 frame header as an example of a header for use with a layer 2 protocol. The Ethernet V2 frame header stores a preamble/SFD for indicating the beginning of a frame, a layer 2 destination terminal MAC address (destination MAC address), a layer 2 transmission source MAC address (source MAC address), and a type for indicating a layer 3 protocol.

FIG. 9 shows the structure of a tag VLAN type Ethernet V2 frame header as an example of a header for use with a layer 2 protocol. The tag VLAN type Ethernet V2 frame header stores a preamble/SFD for indicating the beginning of a frame, a layer 2 destination terminal MAC address (destination MAC address), a layer 2 transmission source MAC address (source MAC address), a TAG protocol ID for representing the tag VLAN type, a priority for indicating the frame forwarding priority, a canonical field indicator (CFI) for indicating that layer 2 routing information is stored, a VLAN ID, which is a VLAN identifier, and a type for indicating a layer 3 protocol.

Figure 1:
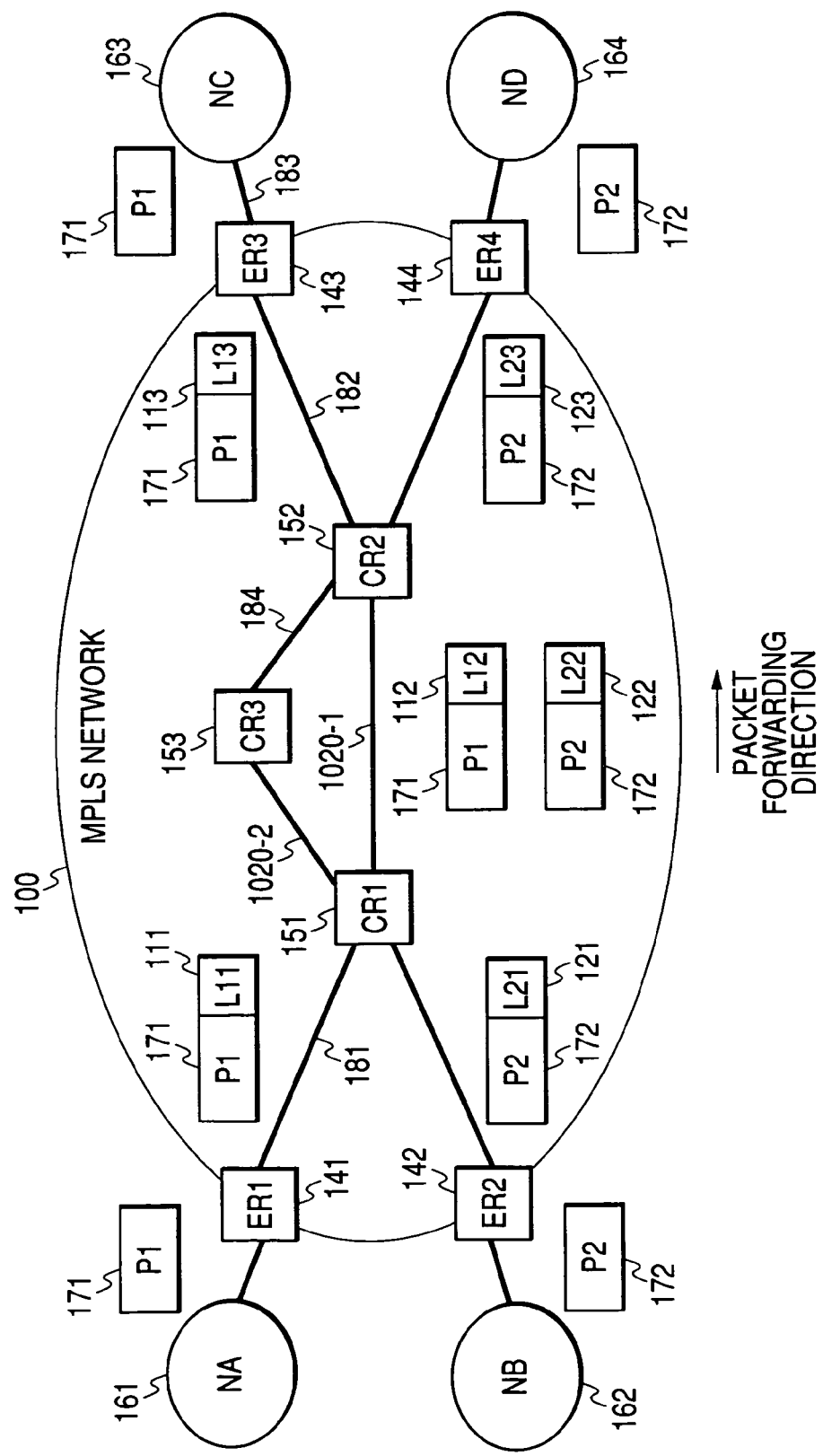
FIG. 1 illustrates an MPLS packet forwarding scheme.

FIG. 10 shows the format of a shim header that composes the MPLS capsule header. The same shim header format commonly applies to shim headers 200-1 to 200-n. The shim header comprises a label field 201, which a router uses to determine the output port and output label; an experimental use (EXP) field 202, which indicates the communication quality of a packet within the MPLS network; an S bit field (bottom of stack field) 203, which indicates the lowermost label for a situation where two or more shim headers are to be assigned (to assign a shim header is hereinafter referred to as "push"); and a time-to-live (TTL) field 204, which indicates the number of routers that can be passed within the network. The format shown in FIG. 10 is the same as shown in FIG. 1 (page 3) of RFC3032.

Upon receipt of an MPLS-capsuled packet, the router searches the label table by using the value in the label field 201 as the search key, and determines the output port, one or more output labels, and next hop IP, which is the IP address of a router that is targeted for the next forwarding. Further, the router judges the communication quality of the packet in accordance with the EXP value, and exercises priority forwarding control for communication quality assurance. Furthermore, the router decrements the value in the TTL field 204 within an input shim header by one, and sets the resulting value in the TTL field within an output shim header. When using Ethernet as a layer 2 protocol, the router determines the corresponding MAC address from the next hop IP and writes the determined MAC address as the destination MAC address shown in FIG. 8 or 9.

Figure 11:
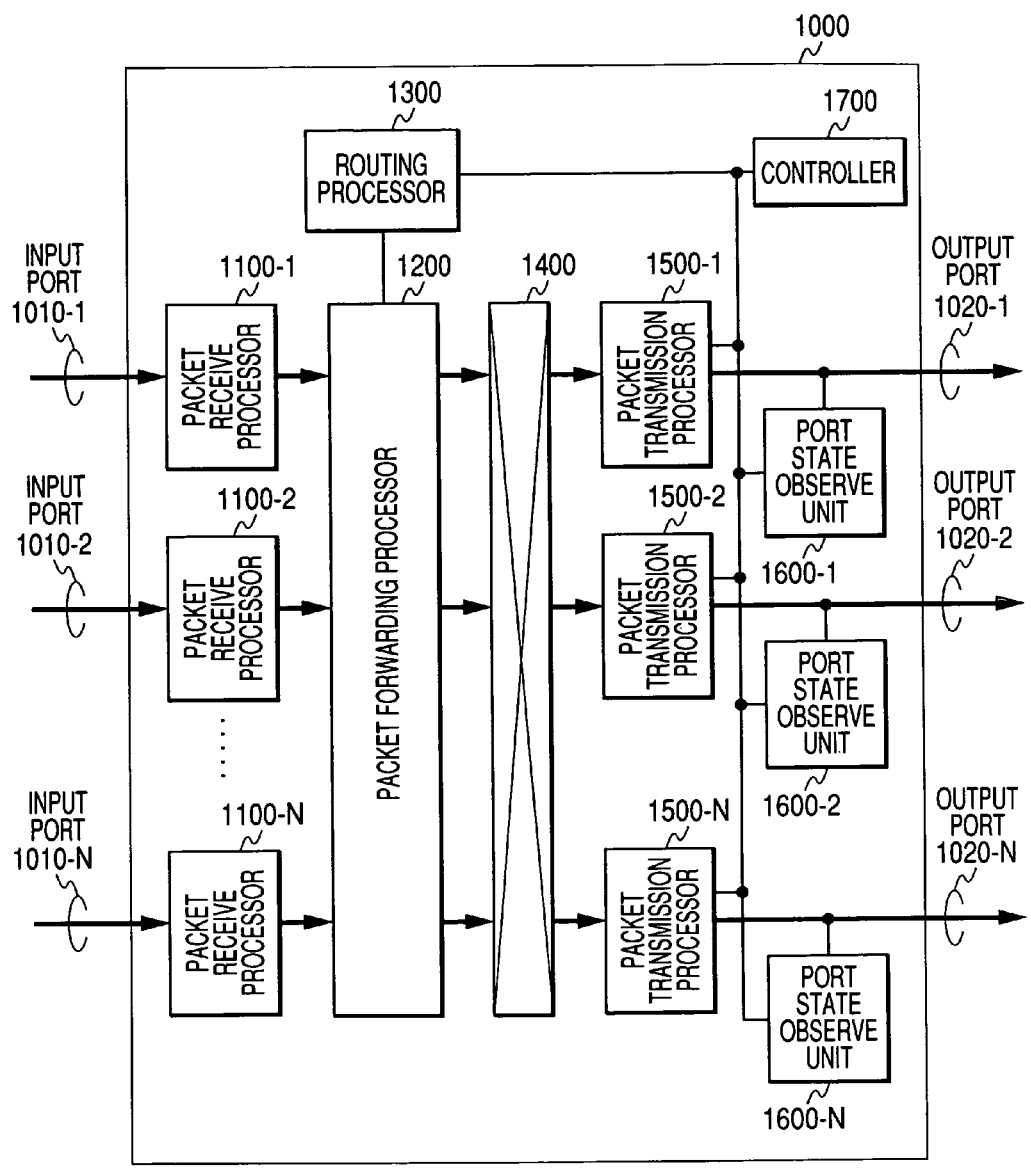
FIG. 11 shows a typical configuration of a router according to the present invention.

An embodiment of a router according to the present invention will now be described with reference to FIGS. 11 to 23. FIG. 11 shows a typical configuration of a router according to the present invention. The router 1000 comprises packet receive processors 1100-$i$ ($i$=1 to N), which perform a packet reception process in relation to N input ports 1010-$i$ into which packets are input; a packet forwarding processor 1200; a routing processor 1300, which determines the packet output port and header information; a switch 1400 for packet switching; packet transmission processors 1500-$j$, which exercises priority forwarding control over each output port; a port state observe unit 1600-$j$ for observing the port status; N output ports 1020-$j$ from which packets are output; and a controller 1700, which exercises overall router control and performs a routing process. More specifically, the controller 1700 performs, for instance, individual table setup within the routing processor and processes fault notifications from each port state observe unit.

Figure 12:
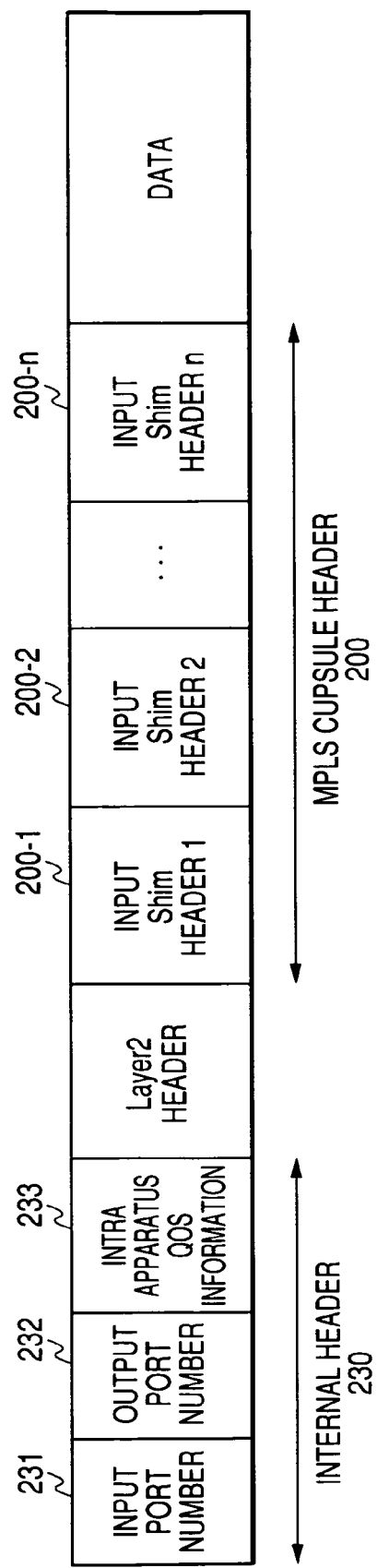
FIG. 12 shows a typical packet format for use in the router according to the present invention.

FIG. 12 shows one embodiment of a packet format within the router 1000. The packet format within the router 1000 is obtained by adding an internal header 230 to the packet format for the MPLS network. The internal header 230 comprises an input port number 231, which is the identifier of a port into which a packet is input; an output port number 232, which is the identifier of a port from which a packet is output; and intra-apparatus QoS information 233, which indicates the communication quality of a packet within the apparatus.

When packets are input from the input ports 1010-$i$ of the router 1000, the packet receive processors 1100-$i$ add the internal header 230, write the port numbers i of input ports 1010-$i$, into which the packets are input, into the field for the input port number 231, and transmit the packets to the packet forwarding processor 1200. At this stage, the output port number 232 and intra-apparatus QoS information 233 are meaningless values.

Upon receipt of the packets, the packet forwarding processor 1200 stores all the contents of the MPLS capsule header 200, data, and internal header 230, extracts the MPLS capsule header information 200 and internal header information 230, and transmits the extracted information to the routing processor 1300.

The routing processor 1300 uses the MPLS capsule header information 210 and internal header information 230 to perform a label table search process, determines the output port (e.g., port 1020-$j$), output shim header, POP count, push count, and intra-apparatus QoS information for indicating the packet communication quality within the apparatus, and conveys the determined information to the packet forwarding processor 1200. The routing processor 1300 also determines the next hop IP by performing a label table search process. Subsequently, the routing processor 1300 determines the MAC address of a router targeted for the next forwarding from the next hop IP, and conveys the determined MAC address to the packet forwarding processor 1200. The configuration and operation of the routing processor 1300 will be described in detail later.

The packet forwarding processor 1200 writes the port number j of output port 1020-$j$ in the internal header field for the output port number 232 and the intra-apparatus QoS information in the internal header field for the intra-apparatus QoS information 233. Further, the packet forwarding processor 1200 uses the output shim header, POP count, and push count to rewrite the shim header within the MPLS capsule header 200. The data length of the MPLS capsule header 200 prevailing at the time of input may differ from that of the MPLS capsule header 200 prevailing at the time of output depending on the POP count and push count. If such a difference is encountered, the data length of the MPLS capsule header is readjusted in accordance with the POP count and push count. Furthermore, the packet forwarding processor 1200 writes the MAC address of a router targeted for the next forwarding as the destination MAC address within the layer 2 header. Subsequently, the packet forwarding processor 1200 transmits the internal packets to the switch 1400.

The switch 1400 performs packet switching in accordance with the output port number 232, and transmits the packets to the packet transmission processors 1500-$j$ for the output ports. The packet transmission processors 1500-$j$ exercise transmission control in accordance with the intra-apparatus QoS information 233 and packet priority, eliminate the internal header 230, and transmit the packets to the output ports 1020-$j$.

The configuration and operation of an embodiment of the router according to the present invention have been described above.

An embodiment of the routing processor 1300 will now be described with reference to FIGS. 13 to 16.

Figure 13:
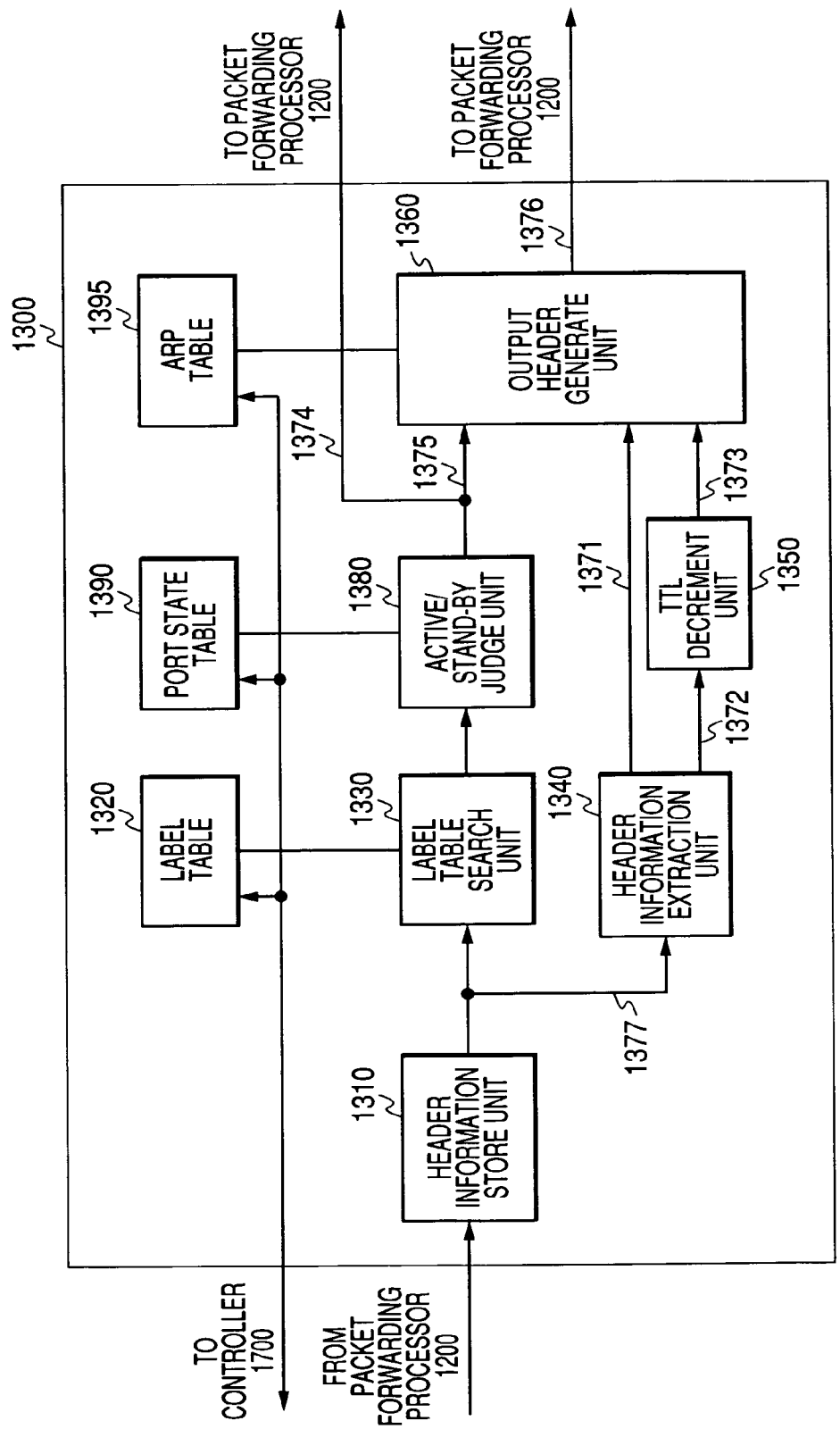
FIG. 13 shows a typical configuration of a routing processor.

FIG. 13 shows a typical configuration of the routing processor 1300. The routing processor 1300 comprises a header information store unit 1310, a label table 1320, a label table search unit 1330 for searching the label table 1320, a header information extraction unit 1340, a TTL decrement unit 1350, an output header generate unit 1360, an ARP (Address Resolution Protocol) table 1395 for storing the association between the next hop IP and the MAC address of a router targeted for the next forwarding, an active/stand-by judge unit 1380, and a port state table 1390.

The header information store unit 1310 stores the MPLS capsule header 200 and internal header 230, which are received from the packet forwarding processor 1200. The header information extraction unit 1340 extracts the EXP value and TTL value from the input shim header that is stored in the header information store unit, outputs the EXP value to the output shim header generate unit 1360 via signal line 1371, and outputs the TTL value to the TTL decrement unit 1350 via signal line 1372. The TTL decrement unit 1350 decrements the TTL value in the input shim header by one and outputs the resulting value to the output header generate unit 1360 via signal line 1373.

Figure 14:
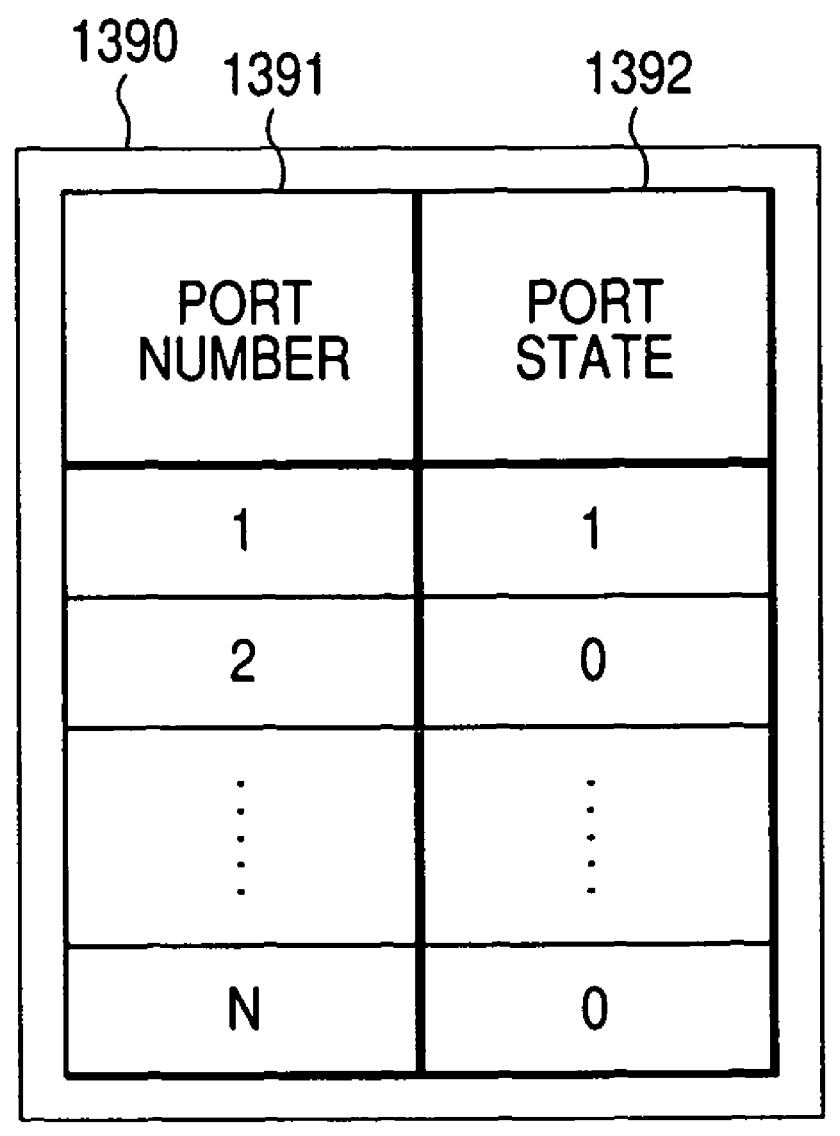

The port state table 1390 retains a bit for each of the ports possessed by the router 1000 to indicate whether the ports are normal or faulty. FIG. 14 shows a typical structure of the port state table 1390. The port state table 1390 shown in FIG. 14 comprises a port number 1391 and a port state 1392. It is assumed that the port state is "0" when no fault exists or "1" when a fault exists.

FIG. 15 shows a typical structure of the label table 1320. The entries in the label table 1320 are classified into search key information, which comprises a label 1321 and an EXP 1322, a normal state search result (hereinafter referred as the active search result), and an abnormal state search result (hereinafter referred to as the stand-by search result). Each of these search results 1323-$j$ ($j$=1, 2) comprises an active/stand-by input shim header POP count 1324-$j$, an output shim header push count 1325-$j$, zero or more output label 1326-$j$ for the push count, an output port number 1327-$j$, a next hop IP 1328-$j$, and intra-apparatus QoS information 1329-$j$.

Figure 2:
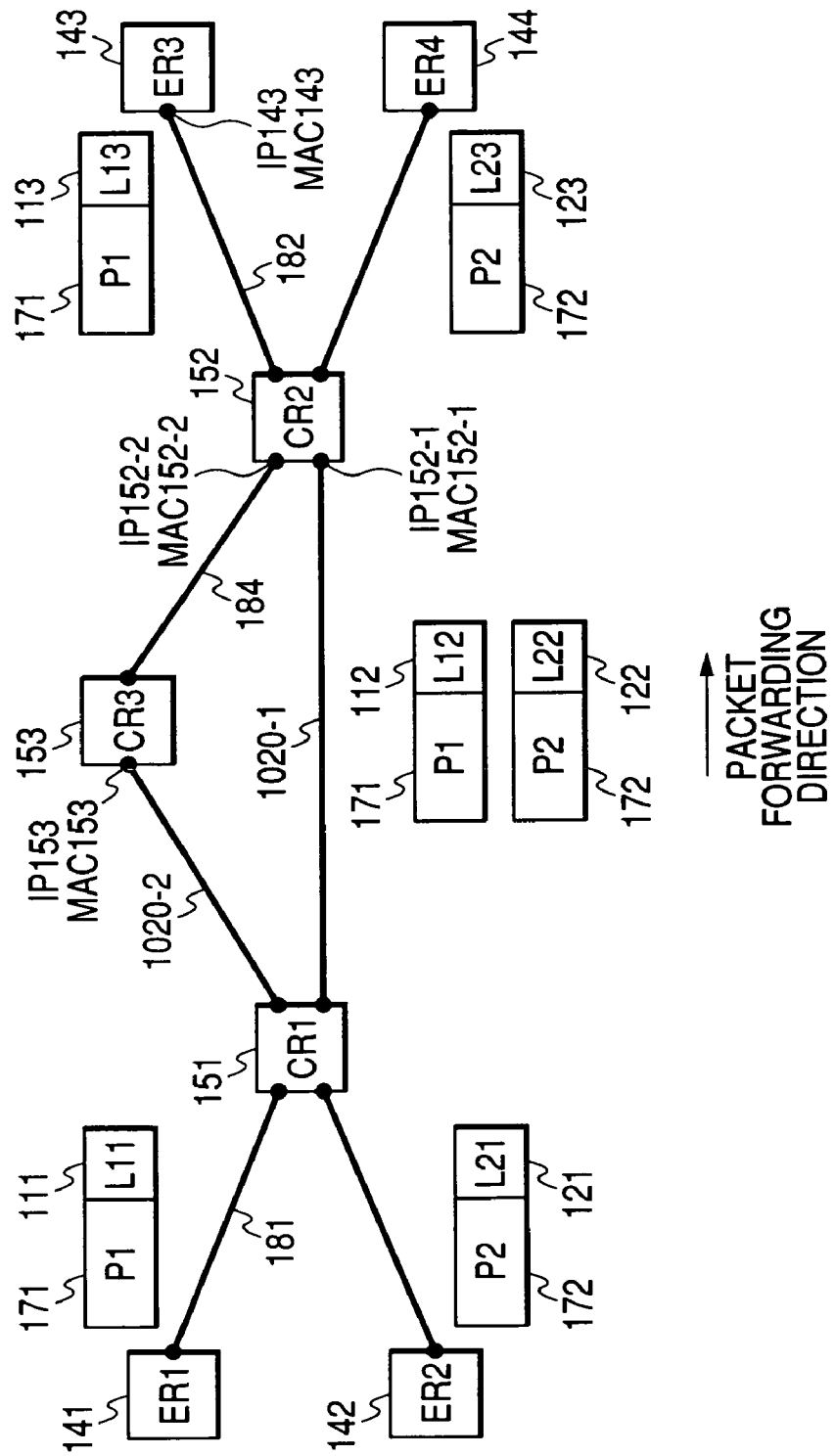
FIG. 2 illustrates a high-speed path switching technology based on conventional MPLS.
Figure 3:
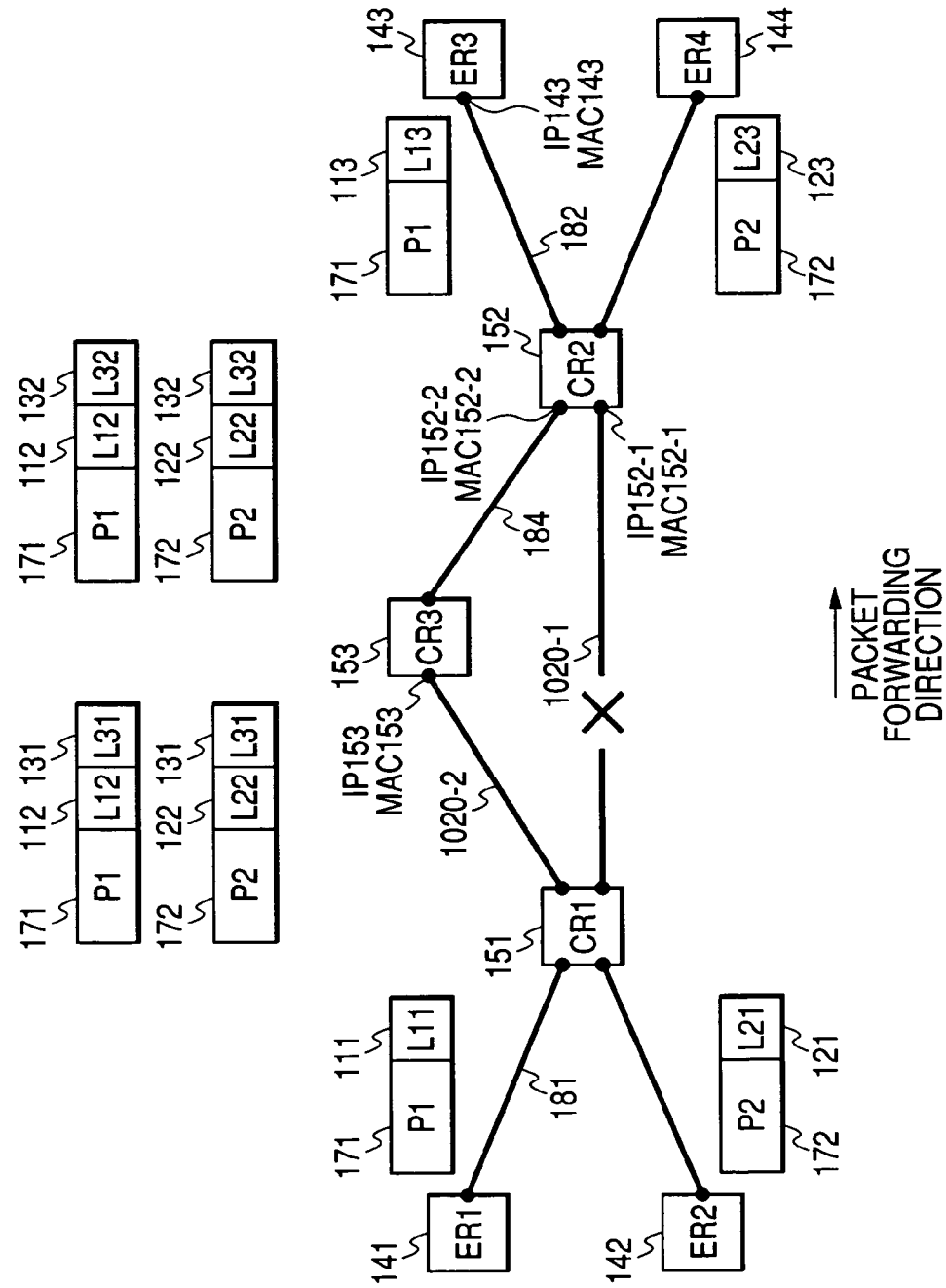
FIG. 3 illustrates a high-speed path switching technology based on conventional MPLS.
Figure 4:
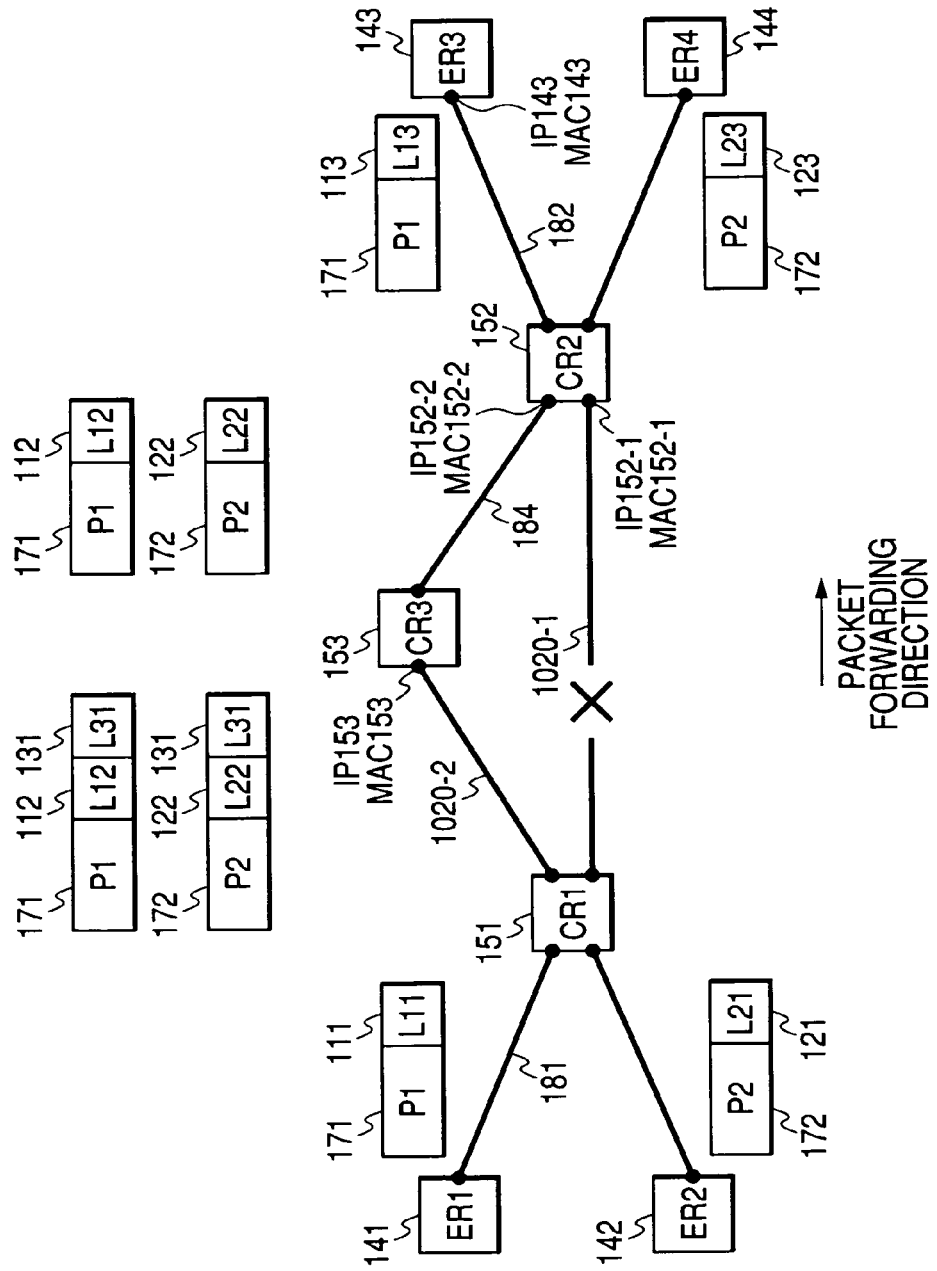
FIG. 4 illustrates a high-speed path switching technology based on conventional MPLS.

FIG. 13 shows table settings that prevail when the router 1000 according to the present invention is applied to router CR1 shown in FIGS. 2, 3, and 4. As regards the active search result 1323-1, the POP count for input labels L11 and L21 is 1. The push count is 1. Only one output label (L12, L22) is set in the label 1 field (1326-1). The output port is 1. The next hop IP is IP 152-1. To set the intra-apparatus QoS information for the input EXP value, two EXP values (E2 and E3) are provided for an entry corresponding to input label L21. As regards the stand-by search result 1323-3, the POP count for labels L11 and L21 is 1. The push count is 2. Two output labels (labels 1 and 2) are set. The output port is 2. The next hop IP is IP 153.

Figure 16:
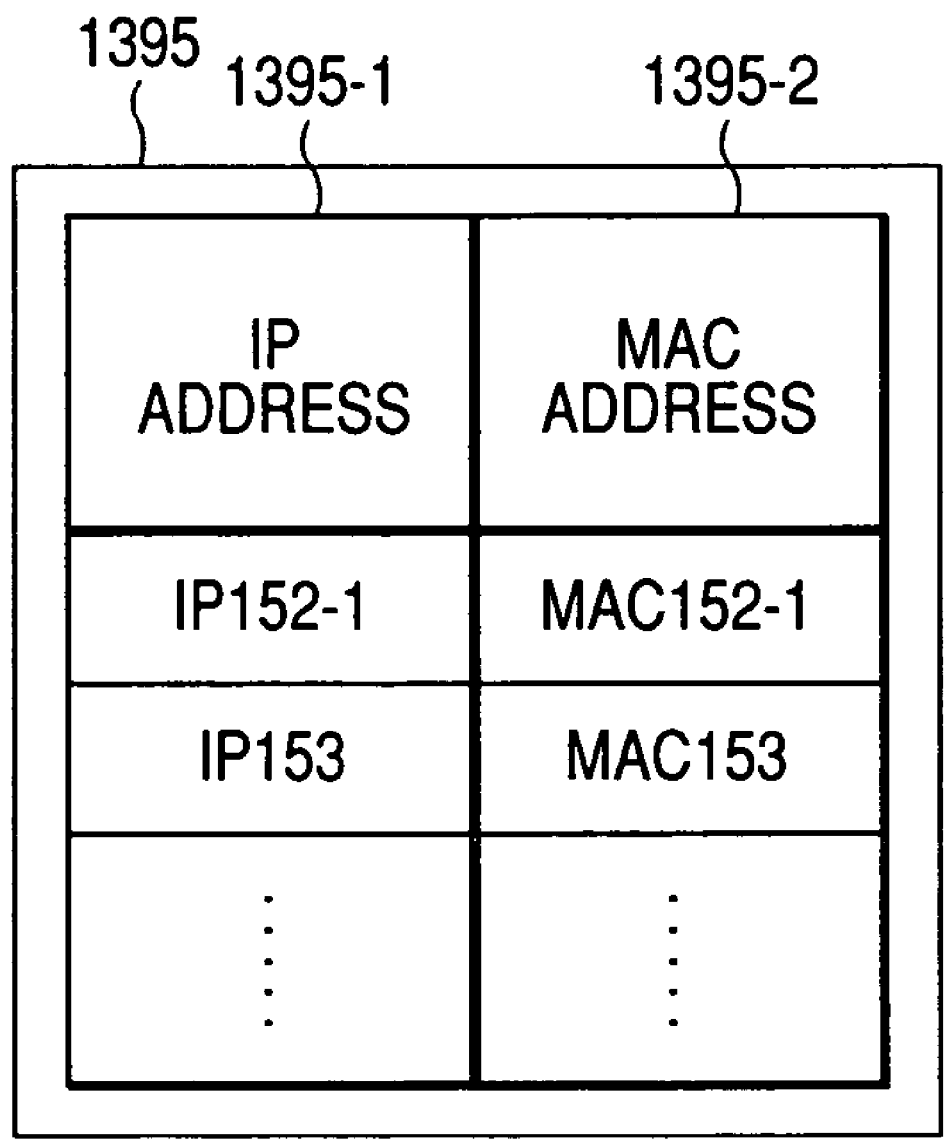
FIG. 16 shows a typical structure of an ARP table.

FIG. 16 shows a typical structure of the ARP table 1395. The entries in the ARP table 1395 are an IP address 1395-1, which is a search key, and a MAC address that is associated with the IP address. FIG. 16 shows typical contents of the ARP table that is retained by router CR1, which is shown in FIGS. 2, 3, and 4. In this instance, the ARP table 1395 shown in FIG. 16 registers a MAC address (MAC 152-1) in relation to the IP address (IP 152-1) of the interface for CR2 port 1020-1, and registers another MAC address (MAC 153) in relation to the IP address (IP 153) of the interface for CR3 port 1020-2. The entries in the ARP table 1395 are generated when router CR1 sends an inquiry to adjacent routers CR2 and CR3 to ask about their MAC addresses corresponding to the IP addresses of routers CR2 and CR3 by using Address Resolution Protocol or the like, which is defined in RFC826, in the case of IP version 4, or by using Neighbor Discovery Protocol or the like, which is defined in RFC2461, in the case of IP version 6.

The operation of the routing processor 1300 will now be described. First of all, the label table search unit 1330 searches the label table 1320 to retrieve information from the header information store unit 1310 by using the information required for a label table search as a search key. As a result of the search, the active search result 1323-1 and stand-by search result 1323-2 corresponding to the search key are obtained. The label table search unit 1330 outputs these two search results to the active/stand-by judge unit 1380. The active/stand-by judge unit 1380 receives the two search results, searches the port state table 1390 by using the active output port number and stand-by output port number as a search key, and reads the states of the active output port and stand-by output port. If the active output port is normal, the active/stand-by judge unit 1380 selects the active search result 1323- 1, and outputs, in compliance with the search key, the input shim header POP count 1324-1, output shim header push count 1325-1, output label 1326-1 for the push count, output port number 1327-1, next hop IP 1328-1, and intra-apparatus QoS information 1329-1 to the packet forwarding processor 1200 via signal line 1374.

The active/stand-by judge unit 1380 outputs the POP count, push count, output label, and next hop IP to the output header generate unit 1360 via signal line 1375. If the active output port is faulty and the stand-by output port is normal, the active/stand-by judge unit 1380 selects the stand-by search result 1323-2 and outputs the same information as the information prevailing when the active output port is normal to the packet forwarding processor 1200 and output header generate unit 1360. If the active output port and stand-by output port are both faulty, the active/stand-by judge unit 1380 issues an instruction for discarding the packets to the packet forwarding processor 1200.

While the label table search is conducted, the header information extraction unit 1340 extracts the EXP value and TTL value from the input shim header, which is among the information stored in the header information store unit 1310, via signal line 1377, outputs the EXP value to the output header generate unit 1360, and outputs the TTL value to the TTL decrement unit 1350. The TTL decrement unit 1350 decrements the TTL value by one, and forwards the resulting value to the output header generate unit 1360 via signal line 1373.

The output header generate unit 1360 performs an output header generation process when it receives the POP count, push count, output label, and next hop IP from the label table search unit 1330 via signal line 1375, receives the EXP value from the header information extraction unit 1340 via signal line 1371, and receives the decremented TTL value from the TTL decrement unit 1350 via signal line 1373. In this instance, the label value received from the active/stand-by judge unit 1380 is used as a label value. As the EXP values for a plurality of output shim headers, the EXP values within the input shim headers received from the header information extraction unit 1340 are used. The value decremented by the TTL decrement unit 1350 is used as the TTL value. The output header generate unit 1360 generates output shim headers the number of which is equal to the push count. Further, the output header generate unit 1360 uses the next hop IP as a search key to search the ARP table 1395 and then determines the MAC address of a router that is targeted for the next forwarding. Subsequently, the output header generate unit 1360 transmits the output shim headers the number of which is equal to the push count and the MAC address of a router that is targeted for the next forwarding to the packet forwarding processor 1200 via signal line 1376.

The foregoing embodiment of the router has been described on the assumption that MPLS is used as a packet forwarding protocol. Alternatively, however, IP or other non-MPLS protocol may be used as the packet forwarding protocol.

The operation of the routing processor 1300 according to the present invention has been described. As described above, if a port failure occurs in a situation where the active search result and stand-by search result are prepared for label table entries and the port state table is retained, the controller can change the table simply by rewriting the state of a faulty port number in the port table. It is therefore possible to reduce the time required for a table change.

Further, different intra-apparatus QoS information can be set for the active search result and stand-by search result. Therefore, the packet forwarding control exercised for packet output to an active output port can be made different from the packet forwarding control exercised for packet output to a stand-by output port. If, for instance, the port band for a stand-by output port is smaller than the port band for an active output port, a high priority is set for all packet outputs from an active output port; however, a high priority is set only for important packet outputs from a stand-by output port whereas a low priority is set for relatively unimportant packet outputs. Thus, even when a switch is made to select a stand-by output port having a small output port band, important packets can be output on a preferential basis.

Second Embodiment

A second embodiment of the routing processor 1300 will now be described with reference to FIGS. 17 to 21. The second embodiment differs from the first embodiment, which has been described with reference to FIGS. 13 to 16.

Figure 17:
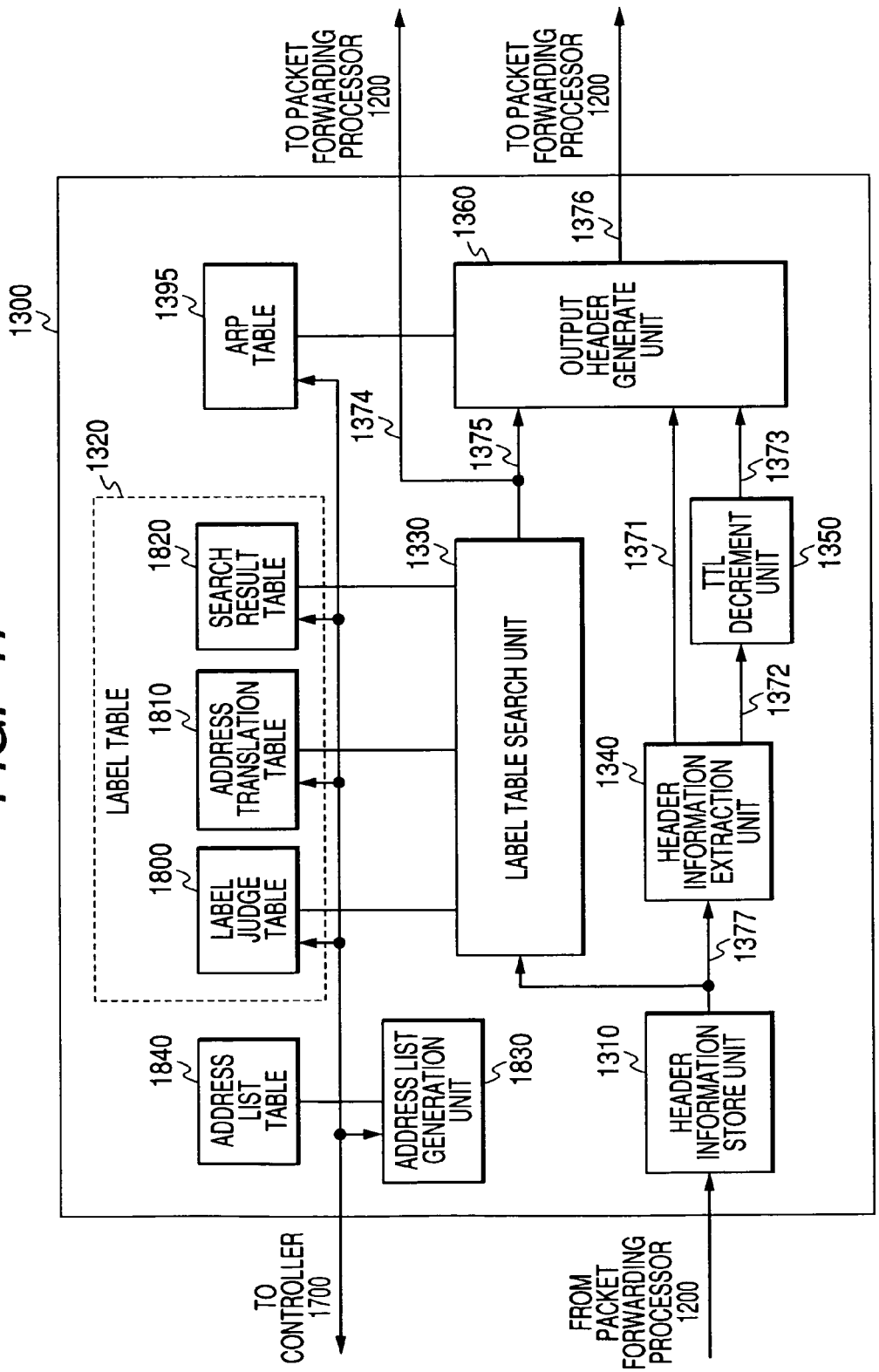
FIG. 17 shows another typical configuration of the routing processor, which differs from the configuration shown in FIG. 13.

FIG. 17 shows a typical configuration of the routing processor 1300. The routing processor 1300 shown in FIG. 17 comprises a header information store unit 1310, a label table 1320, a label table search unit 1330 for searching the label table 1320, a header information extraction unit 1340, a TTL decrement unit 1350, an output header generation unit 1360, an ARP table 1395, an address list generation unit 1830, and an address list table 1840.

The label table 1320 shown in FIG. 17 comprises a label judge table 1800, an address translation table 1810, and a search result table 1820. A typical label table prevailing when CR1 output port 1020-1, which is described with reference to FIG. 2, is normal will now be described.

FIG. 18 shows a typical structure of the label judge table 1800. The label judge table 1800 comprises a label 1321 and an EXP 1322, which serve as a search key, and an address translation table address 1801 that is associated with the label 1321 and EXP 1322.

FIG. 19 shows a typical structure of the address translation table 1810. The address translation table 1810 comprises an address 1811 for indicating a location at which an entry is registered, and a search result table address 1812 that is positioned within the search result table 1820 for registering a plurality of search results and used to register a search result. The address translation table address 1801, which is registered in the label judge table 1800 shown in FIG. 18, corresponds on a one-to-one basis to the address 1811 in the address translation table 1810 shown in FIG. 19.

FIG. 20 shows a typical structure of the search result table 1820. The entries in the search result table 1820 are an address 1821 for indicating the location at which a search result is registered, an input shim header POP count 1324, an output shim header push count 1325, zero or more output labels 1326 the number of which is equal to the push count, an output port number 1327, a next hop IP 1328, and intra-apparatus QoS information 1329. The search result table address 1812 registered in the address translation table 1810 shown in FIG. 19 corresponds on a one-to-one basis to the address 1821 indicated in the search result table 1820.

FIG. 20 shows table settings that prevail when the router 1000 according to the present invention is applied to router CR1 shown in FIGS. 2, 3, and 4. The present embodiment sets both the active search result and stand-by search result in the search result table 1820. In the example shown in FIG. 20, the active search result is set at addresses 1, 2, and 2, whereas the stand-by search result is set at addresses 4, 5, and 6. As regards the active search results set at addresses 1, 2, and 3, the POP count for input labels L11 and L21 is 1. The push count is 1. Only one output label (L12, L22) is set in the label 1 field (1326). The output port is 1. The next hop IP is IP 152-1. To set the intra-apparatus QoS information for the input EXP value, two EXP values (E2 and E3) are set at addresses 2 and 3 as the entries corresponding to input label L21. As regards the stand-by search result set at addresses 4, 5, and 6, the POP count for labels L11 and L21 is 1. The push count is 2. Two output labels (labels 1 and 2) are set. The output port is 2. The next hop IP is IP 153. Two EXP values (E2 and E3) are set at addresses 5 and 6 as the entries corresponding to input label L21.

The address list generation unit 1370 and address list table 1740 will now be described with reference to FIGS. 21, 22, and 23.

FIG. 21 shows typical write information that is transmitted to the routing processor 1300 when the controller 1700 writes the active search result for input label L11 and EXP E1 into the tables within the label table 1320. As regards the write information shown in FIG. 21, the input label and EXP are stored as the label information. The write information also includes a stand-by identifier for indicating whether the write information relates to an active search result or stand-by search result, an input shim header POP count, an output shim header push count, zero or more output labels the number of which is equal to the push count, an active output port number, a next hop IP, and intra-apparatus QoS information. Further, there is a field for a stand-by output port number. In the present embodiment, however, the write information is used for writing an active search result. Therefore, an insignificant value is set in the field for a stand-by output port number. Since FIG. 21 shows an example of write information that is used when an active search result is to be written, the value "0" is stored in the stand-by identifier field to indicate that an active search result is written.

FIG. 22 shows typical write information that is transmitted to the routing processor 1300 when the controller 1700 writes the stand-by search result for input label L11 and EXP E1 into the tables within the label table 1320. The same types of information are stored as indicated in FIG. 21. However, FIG. 22 shows an example of write information that is used when a stand-by search result is to be written. Therefore, the value "1" is stored in the stand-by identifier field to indicate that a stand-by search result is written. Further, the value "1", which is stored as an active search result value, is stored as the active output port number, whereas the value "2" is stored as the stand-by output port number.

Figure 23:
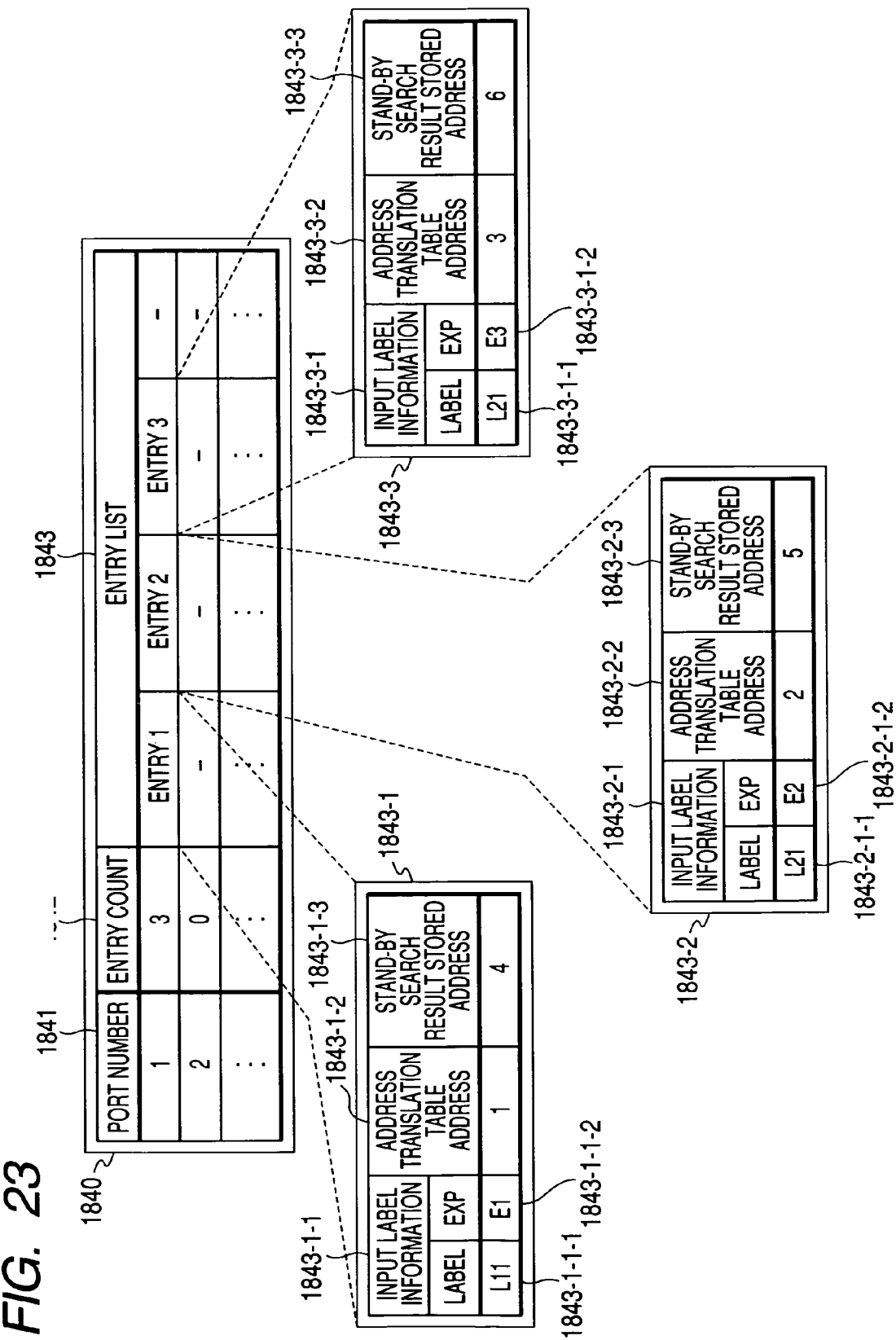
FIG. 23 shows a typical structure of an address list table.

FIG. 23 shows a typical structure of the address list table 1840. The address list table 1840 comprises an active output port number 1841, an entry list 1843, and an entry count 1842. The entry list 1843 contains a plurality of entries 1843-*k*. Each entry 1843-*k* comprises all input label information 1843-*k*-1 (k=1, 2, 3) (input label 1843-*k*-1-1 and EXP 1843-*k*-1-2) that is associated with the active output port number and uses the active output port number 1841 as an output port, an address translation table address 1843-*k*-2 that is associated with the input label and recorded, and a stand-by search result stored address 1843-*k*-3. The address list 1843 may be organized so as to join individual entries with a pointer or consecutively position the entries at consecutive addresses of a memory that constitutes the address list table.

The operation that the address list generation unit 1830 performs when the controller 1700 writes the active search result for input label L11 and EXP E1 into the tables within the label table 1320 will now be described. When the controller 1700 writes the active search result into the tables within the label table 1320, the address list generation unit 1830 extracts label L11 and EXP E1, which are written into the label judge table 1800 as the label information, an address translation table address setting of 1, which corresponds to the label information registered in the label judge table 1800, and the output port number "1", which is recorded at the address indicated by an address setting of 1, from the write information shown in FIG. 21, handles the label, EXP, and address translation table address setting as one entry, and writes the entry as entry 1 (1843-1) in the address list table, which corresponds to output port 1.

The operation that the address list generation unit 1830 performs when the controller 1700 writes the stand-by search result for input label L11 and EXP E1 into the tables within the label table 1320 will now be described. When the controller 1700 writes the stand-by search result into the search result table 1820 within the label table 1320, the address list generation unit 1830 searches the write information shown in FIG. 22 for all address list entries corresponding to the active output port number "1" and retrieves an entry that matches the label information (label L11 and EXP E1) within the write information shown in FIG. 22. In the currently used example, label L11 and EXP E1 are recorded as the entry 1 label information. Therefore, the result of the above search indicates that entry 1 is a match. Subsequently, the address list generation unit 1830 writes the search result table address "4", at which the POP count, push count, output label information, stand-by output port number, next hop IP, and intra-apparatus QoS information shown in FIG. 22 are recorded, at the stand-by search result stored address 1343-1-3 for entry 1.

The process that the address list generation unit 1830 performs when output port 1 is faulty will now be described. When output port 1 becomes faulty, the address list generation unit 1830 reads an address list corresponding to output port 1 from the address list table, and replaces the address translation table address value recorded at the address translation table address 1843-*k*-2 within each entry 1843-*k* with a value registered at the stand-by search result stored address 1843-*k*-3 within each entry 1843-*k*. When the above process is performed for all entries within an address list that corresponds to output port 1, which is faulty, the search results for label table entries that use port 1 as the output port can be changed from active search results to stand-by search results.

The operation performed by the routing processor 1300 shown in FIG. 17 will now be described. First of all, the label table search unit 1330 searches the label judge table 1800 by using the information that is stored in the header information store unit 1310 and necessary for a label judge table search as a search key. As a result of the search, the address 1811 of the address translation table 1810 that matches the search key is determined. Next, the label table search unit 1330 reads a search result table address 1812 that is recorded at the determined address 1811 within the address translation table 1810. The label table search unit 1330 then determines the input shim header POP count 1324, the output shim header push cont 1325, the output labels 1326 the number of which is equal to the push count, the output port number 1327, the next hop IP 1328, and the intra-apparatus QoS information 1329, which are the search results recorded at the read search result table address 1812. The label table search unit 1330 directly outputs the POP count, push count, output port number, and intra-apparatus QoS information, which are among the read search result, to the packet forwarding processor 1200 via signal line 1374. Further, the label table search unit 1330 outputs the POP count, push count, output label, and next hop IP to the output header generation unit 1360 via signal line 1375.

While the label table search is conducted, the header information extraction unit 1340 extracts the EXP value and TTL value from the input shim header, which is among the information stored in the header information store unit 1310, via signal line 1377, outputs the EXP value to the output header generation unit 1360, and outputs the TTL value to the TTL decrement unit 1350. The TTL decrement unit 1350 decrements the TTL value by one, and forwards the resulting value to the output header generation unit 1360 via signal line 1373.

The output header generation unit 1360 performs an output header generation process when it receives the POP count, push count, output label, and next hop IP from the label table search unit 1330 via signal line 1375, receives the EXP value from the header information extraction unit 1340 via signal line 1371, and receives the decremented TTL value from the TTL decrement unit 1350 via signal line 1373. In this instance, the label value received from the label table search unit 1330 is used as a label value. As the EXP values for a plurality of output shim headers, the EXP values within the input shim headers received from the header information extraction unit 1340 are used. The value decremented by the TTL decrement unit 1350 is used as the TTL value. The output header generation unit 1360 generates output shim headers the number of which is equal to the push count. Further, the output header generation unit 1360 uses the next hop IP as a search key to search the ARP table 1395 and then determines the MAC address of a router that is targeted for the next forwarding. Subsequently, the output header generation unit 1360 transmits the output shim headers the number of which is equal to the push count and the MAC address of a router that is targeted for the next forwarding to the packet forwarding processor 1200 via signal line 1376.

The operation of the second embodiment of the routing processor 1300 according to the present invention, which is different from another embodiment that is described with reference to FIG. 13, has been described. As described above, the active and stand-by search results are prepared in the search result table 1820. When no output port abnormality exists, the search result table address at which the active search result is stored is recorded at the search result table address within the address translation table in order to determine the output label, output port, next hop IP, and intra-apparatus QoS information prevailing when no output port abnormality exists. When an output port abnormality occurs, the address translation table address that is within the address list table prerecorded for each faulty output port and should be rewritten and the contents of the address translation table to be rewritten are consecutively read, and the search result table address within the address translation table is rewritten so as to switch from a search result table address at which an active search result is recorded to a search result table address at which a stand-by search result is recorded. In this manner, the search result can be rapidly changed from an active search result to a stand-by search result. Further, when an embodiment of the present invention that is described with reference to FIG. 17 is used, the search result information read from a search result table for packet reception can be accomplished by reading either the active search result information or stand-by search result information. Therefore, it is possible to decrease the number of times the search result table storage memory needs to be accessed for a read and increase the speeds of a packet search process and packet forwarding process.

The present invention can be applied to a packet forwarding apparatus such as a router for forwarding IP packets and MPLS packets and a switch for forwarding Ethernet frames. When one of the ports possessed by the packet forwarding apparatus becomes faulty, the present invention can be used as a method for rapidly replacing a packet output port and the header information assigned to a packet with another port and the header information corresponding to the latter port.

What is claimed is:

1. A packet forwarding apparatus comprising:
a first output port;
a second output port;
a routing processing section;
a memory having a first area and a second area; and
a judgment section that monitors conditions of the first and second output ports, and judges whether the first output port or the second output port is to be used based on a condition of the first output port and the second output port,
wherein the memory retains an identifier of the first output port, first new header information, an identifier of the second output port, and second new header information, which are associated with at least part of header information about a received packet, in the first area,
wherein the memory retains a first address indicating a storage location of the first output port and the first new header information in the first area,
wherein the memory retains a second address indicating a storage location of the second output port and the second new header information in the second area;
wherein, upon the judgment section judging that the first output port is to be used, the first output port transmits the received packet with the header information about the received packet replaced with the first new header information, which is read from the memory in accordance with the first address in the first area, and
wherein, upon the judgment section judging that a failure of the first output port is detected and that the second output port is to be used, the routing processing section replaces the first address in the first area with the second address, which is read from the second area according to the identifier of the second output port, the router processing section reads the second address that has replaced the first address in the first area, and the second output port transmits the received packet with the header information about the received packet replaced by the second new header information.

2. The packet forwarding apparatus according to claim 1, wherein the header information about the received packet contains a label for identifying a logical line that is used by the received packet.

3. The packet forwarding apparatus according to claim 2, wherein the header information about the received packet is an MPLS shim header.

4. The packet forwarding apparatus according to claim 1, wherein the header information about the received packet is an IP header.

5. The packet forwarding apparatus according to claim 1, wherein the header information about the received packet is an Ethernet header.

6. The packet forwarding apparatus according to claim 1, wherein the memory further retains a first forwarding process priority and a second forwarding process priority, which are associated with at least part of the header information about the received packet; a third address for indicating a storage location of the first forwarding process priority; and a fourth address for indicating a storage location of the second forwarding process priority; wherein, when the judgment section judges that the first output port should be used, the received packet is forwarded according to the first forwarding process priority that is read from the memory in accordance with the third address; and wherein, when the judgment section judges that the second output port should be used, the received packet is forwarded according to the second forwarding process priority that is read from the memory in accordance with the fourth address.

* * * * *